United States Patent
Yasumura

(10) Patent No.: US 6,411,528 B1
(45) Date of Patent: *Jun. 25, 2002

(54) SWITCHING POWER CIRCUIT AND INSULATING CONVERTER TRANSFORMER

(75) Inventor: Masayuki Yasumura, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/672,861

(22) Filed: Sep. 28, 2000

(30) Foreign Application Priority Data

Sep. 30, 1999 (JP) .......................................... 11-278985

(51) Int. Cl.⁷ ............................................. H03M 3/335
(52) U.S. Cl. ......................... 363/19; 336/170; 336/180
(58) Field of Search ......................... 336/170, 180–183, 336/185, 222, 198; 363/16–20, 20.1–20.3, 97, 131

(56) References Cited

U.S. PATENT DOCUMENTS

| | | | |
|---|---|---|---|
| 4,229,786 A | 10/1980 | Mitani et al. | |
| 4,628,426 A | 12/1986 | Steigerwald | |
| 5,751,205 A | 5/1998 | Goseberg | |
| 6,064,291 A | * 5/2000 | Urabe et al. | ................. 336/222 |
| 6,278,620 B1 | * 8/2001 | Yasumura | ................... 363/19 |

OTHER PUBLICATIONS

Patent Abstracts of Japan vol. 1996, No. 07. Jul. 31, 1996 & JP 08 066026 A (Sony Corp), Mar. 8, 1996.
Patent Abstracts of Japan vol. 1996, No. 31, 1996, No. 01, Jan. 31, 1996 & JP 07 245222 A (Sony Corp), Sep. 19, 1995.

* cited by examiner

*Primary Examiner*—Lincoln Donovan
*Assistant Examiner*—Tuyen T. Nguyen
(74) *Attorney, Agent, or Firm*—Frommer Lawrence & Haug LLP; William S. Frommer

(57) ABSTRACT

The invention provides a switching power circuit and an insulating converter transformer. A tertiary winding to be formed on the secondary side of an insulating converter transformer is coiled in such a manner as to achieve a state of tight coupling with respect to a primary winding on the primary side of the insulating converter transformer and also to a secondary winding on the secondary side thereof, so that the peak value of a secondary current outputted from a second half-wave rectifying circuit can be reduced by the tertiary winding of the insulating converter transformer.

3 Claims, 10 Drawing Sheets

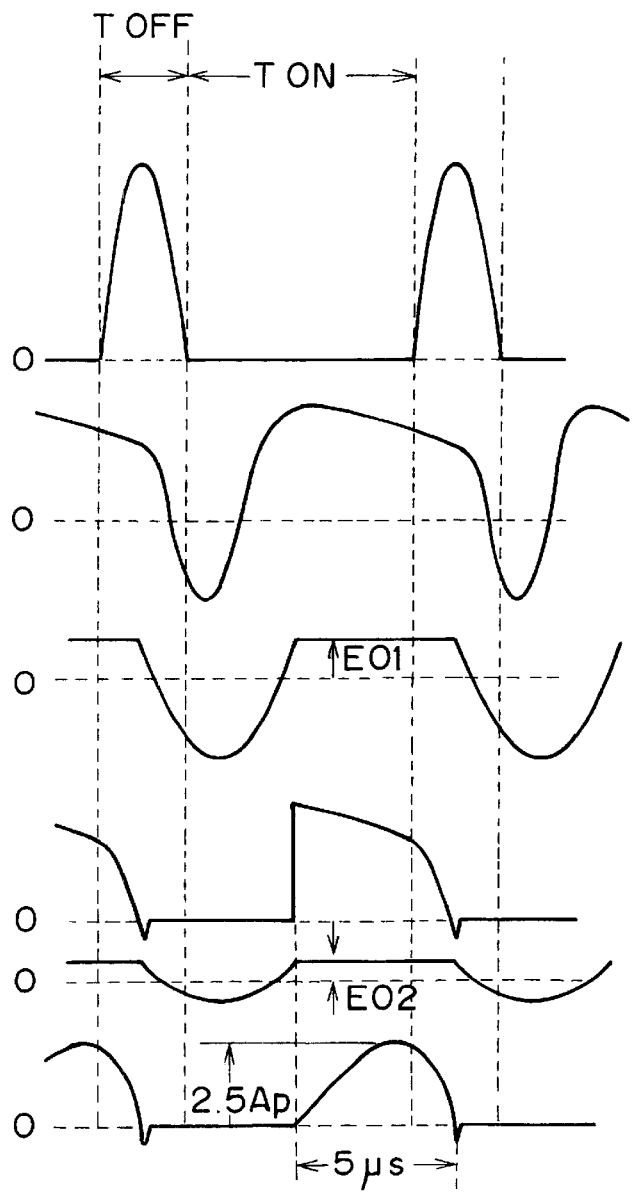

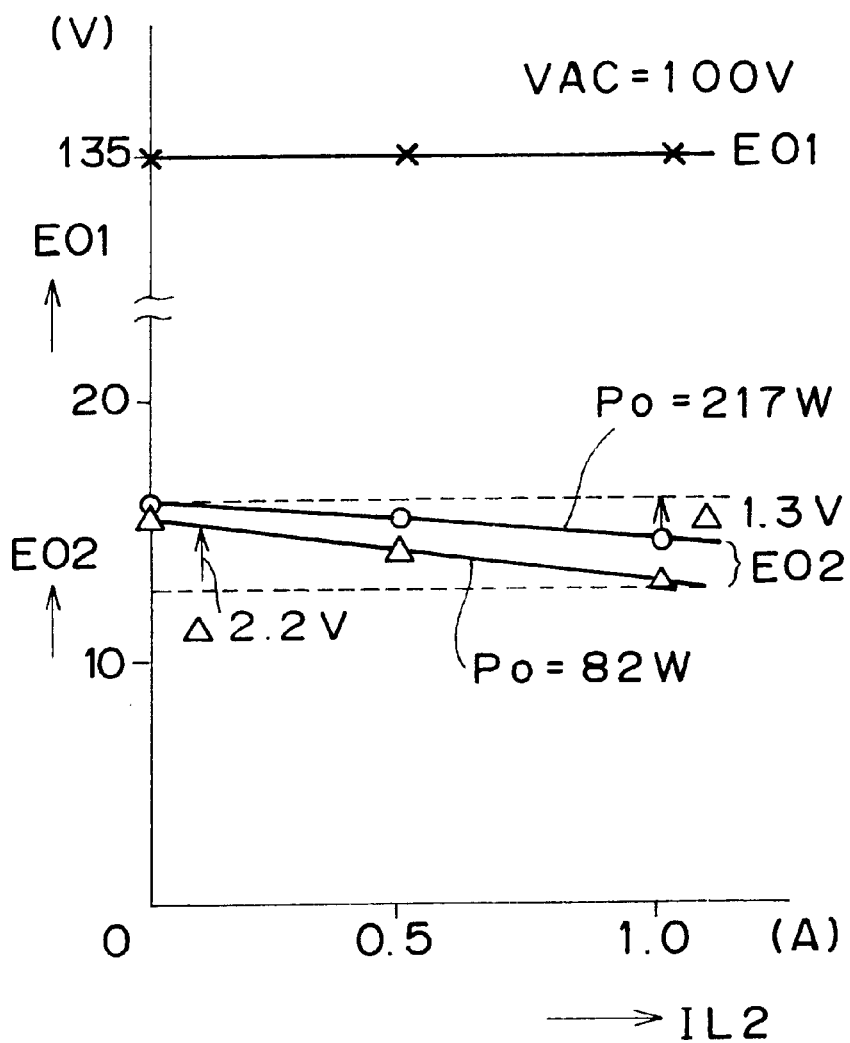

F I G. 10
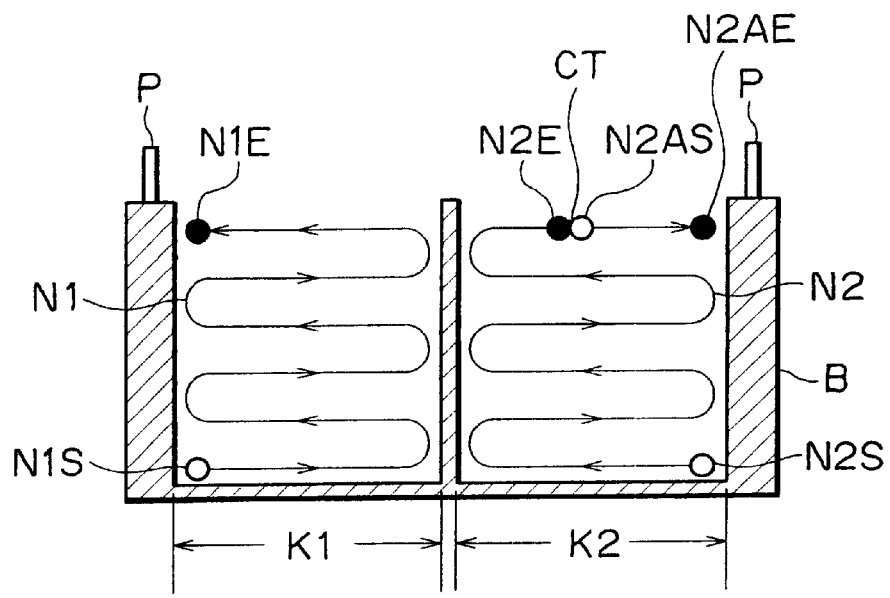
F I G. 11
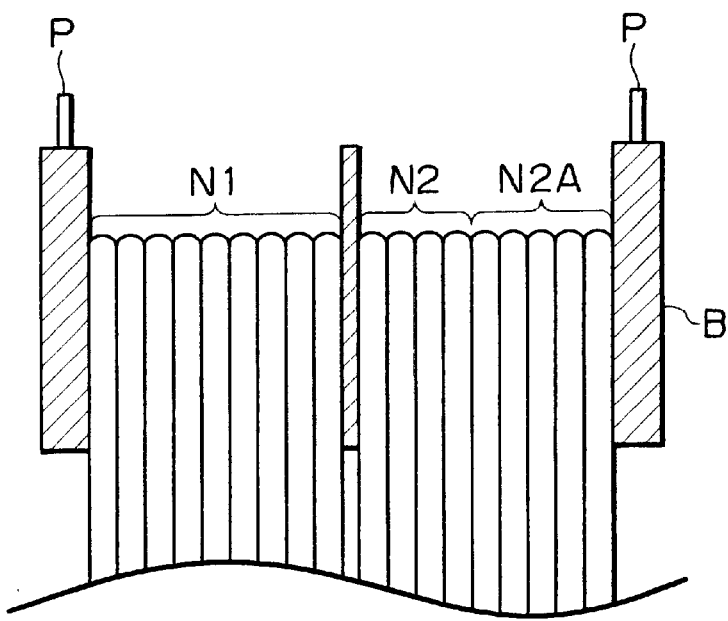

FIG. 12A Vcp
FIG. 12B I2
FIG. 12C V2
FIG. 12D I3
FIG. 12E V3
FIG. 12F I4

SWITCHING POWER CIRCUIT AND INSULATING CONVERTER TRANSFORMER

BACKGROUND OF THE INVENTION

The present invention relates to an insulating converter transformer, and also to a switching power circuit equipped with an insulating converter transformer for use as a power supply in various electronic apparatus.

There are widely known switching power circuits of a type employing a switching converter such as a flyback converter or a forward converter. Since such a switching converter performs its switching operation with rectangular waves, there exists a limit in suppression of switching noise. And it is also obvious that, due to the operating characteristic thereof, some restriction is unavoidable in improving the power conversion efficiency.

In view of the points mentioned above, a variety of switching power circuits employing various resonance type converters have already been proposed by the present applicant. A resonance type converter is capable of attaining a high power conversion efficiency with facility and realizing low noise as the switching operation is performed with sinusoidal waves. And it is further possible to achieve another merit that the circuit can be constituted of a relatively smaller number of component parts.

FIG. 7 is a circuit diagram showing an exemplary switching power circuit of a configuration based on the invention filed previously by the present applicant. This power circuit is equipped with a voltage resonance type converter which consists of a switching element Q1 of one transistor and performs its self-excited switching operation in a single end form.

In the power circuit shown in this diagram, there is provided a full-wave rectifying circuit which comprises a bridge rectifying circuit Di and a smoothing capacitor Ci to serve as a rectifying and smoothing circuit for obtaining a DC input voltage from a commercial alternating power supply (alternating input voltage VAC), wherein a rectified smoothed voltage Ei corresponding to, e.g., one-fold level of the alternating input voltage VAC is generated. In this rectifying and smoothing circuit, a rush current limiting resistor Ri is inserted in its rectified current path so as to suppress a rush current which flows into the smoothing capacitor Ci when the power supply is turned on for example.

The voltage resonance type switching converter in this power circuit adopts a self-excited structure equipped with a switching element Q1 of one transistor. In this case, the switching element Q1 consists of a high withstand voltage bipolar transistor (BJT: junction transistor).

The base of the switching element Q1 is connected to the positive side of the smoothing capacitor Ci (rectified smoothed voltage Ei) via a starting resistor RS, so that a base current at the start is obtained from a rectifying and smoothing line. And a series resonance circuit for self-excited oscillation driving, which consists of a series connection circuit of a driving coil NB, a resonance capacitor CB and a base current limiting resistor RB, is connected between the base of the switching element Q1 and a primary-side ground.

A path of a clamp current flowing during the off-time of the switching element Q1 is formed by a clamp diode DD inserted between the base of the switching element Q1 and the negative terminal (primary-side ground) of the smoothing capacitor Ci. Meanwhile, the collector of the switching element Q1 is connected to one end of the primary winding N1 of an insulating converter transformer PIT, and the emitter thereof is grounded.

A parallel resonance capacitor Cr is connected in parallel to the collector-emitter of the switching element Q1. This parallel resonance capacitor Cr constitutes a primary parallel resonance circuit of the voltage resonance type converter by the self capacitance thereof and a leakage inductance L1 of the primary winding N1 of the undermentioned insulating converter transformer PIT. Although a detailed description is omitted here, a voltage Vcp obtained across the resonance capacitor Cr due to the action of this parallel resonance circuit is actually composed of a sine-wave pulse during the off-time of the switching element Q1, so that the operation is performed in a voltage resonance mode.

An orthogonal control transformer PRT shown in this diagram is a saturable reactor where a detection coil ND, a driving coil NB and a control coil NC are wound. This orthogonal transformer PRT is provided for driving the switching element Q1 and also for executing constant voltage control.

In the structure of this orthogonal control transformer PRT, although not illustrated, two double U-shaped cores having four magnetic legs form a solid core where the ends of the respective magnetic legs are mutually joined. And a detection coil ND and a driving coil NB are wound around two predetermined magnetic legs of the solid core in the same direction, and further a control coil NC is wound orthogonally to the detection coil ND and the driving coil NB.

In this case, the detection coil ND of the orthogonal control transformer PRT is inserted in series between the positive terminal of the smoothing capacitor Ci and the primary winding N1 of the insulating converter transformer PIT, so that the switching output of the switching element Q1 is transferred to the detection coil ND via the primary winding N1. In the orthogonal control transformer PRT, the switching output obtained in the detection coil ND is induced in the driving coil NB through transformer coupling, hence generating an alternating voltage as a driving voltage in the driving coil NB. This driving voltage is delivered as a driving current from the series resonance circuit (NB, CB), which constitutes a self-excited oscillation driving circuit, to the base of the switching element Q1 via the base current limiting resistor RB. Consequently, the switching element Q1 performs its switching operation at a switching frequency determined by the resonance frequency of the series resonance circuit (NB, CB).

The insulating converter transformer PIT transfers the switching output of the switching element Q1 to the secondary side.

As shown in FIG. 8, the insulating converter transformer PIT has an EE-shaped core where E-shaped cores CR1 and CR2 composed of ferrite for example are combined with each other in such a manner that magnetic legs thereof are opposed mutually, and the primary winding N1 and the secondary windings N2 (and N2A) thereof are coiled in a split state respectively by the use of a split bobbin B with regard to the center magnetic leg of the EE-shaped core. And a gap G is formed to the center magnetic leg as shown in the diagram, whereby loose coupling is attained with a required coupling coefficient.

The gap G can be formed by shaping the center magnetic leg of each of the E-shaped cores CR1 and CR2 to be shorter than the two outer magnetic legs thereof. The coupling coefficient k is set as, e.g., k≈0.85 suited to attain loose coupling, hence avoiding a saturated state correspondingly thereto.

Referring now to FIGS. 10 and 11, a description will be given on the primary winding N1 and the secondary windings N2 (and N2A) coiled around the split bobbin B of the insulating converter transformer PIT.

FIG. 10 is a diagram typically showing how the primary winding N1 and the secondary windings N2 (and N2A) are coiled around the split bobbin B.

The split bobbin B has split areas for coiling the primary winding N1 and the secondary windings N2 (and N2A) respectively. This diagram represents an example where the primary winding N1 coiled around the split bobbin B has an intra-bobbin winding width K1, and the secondary windings N2 (and N2A) coiled around the split bobbin B have an intra-bobbin winding width K2.

In this case, the primary winding N1 is coiled in a fixed direction from a predetermined start position N1S. And when the primary winding N1 thus coiled has reached the end of the intra-bobbin winding width K1, it is coiled on the preceding primary winding N1 in the reverse direction with respect to the preceding primary winding N1. The primary winding N1 is coiled in this manner until an end position N1E of the primary winding N1 after a predetermined number of turns thereof.

In FIG. 10, there is typically shown an example where the start position N1S of the primary winding N1 is at the center (lower portion) of the split bobbin B and is spaced apart most (left position) from the secondary winding N2. The primary winding N1 is coiled from the start position N1S while its direction is alternately changed as rightward→leftward→rightward→... up to the end position N1E which is at the left of the outside (upper portion) of the split bobbin B.

Similarly to the primary winding N1 mentioned above, each of the secondary windings N2 (and N2A) is coiled from a predetermined start position N2S within the intra-bobbin winding width K2 by a predetermined number of turns while the direction thereof is changed alternately. In this case, however, the secondary winding N2 is formed to partially serve as the secondary winding N2A as will be described later, so that the secondary winding N2 is once led out as a center tap CT, and then the secondary winding N2A is coiled thereon.

In this case where the output level of the secondary winding N2A is, for example, about ⅒ of the output level of the secondary winding N2, the number of turns of the secondary winding N2A is approximately ⅙ to ⅒ of that of the secondary winding N2, and therefore it is less than 5 turns.

The example of FIG. 10 typically shows that the secondary winding N2 coiled from the start position N1S is led out as a center tap CT at the end position N2E, and then is coiled, as the secondary winding N2A, from its start position N2AS up to its end position N2AE.

The ends of the primary winding N1 and secondary windings N2 (and N2A) led out respectively from the start positions N1S, N2S and the end positions N1E, N2AE, and the center tap CT thereof, are bound and soldered respectively to predetermined pin terminals P, P . . . provided on, e.g., the top surface of the split bobbin B.

As shown in FIG. 11, the primary winding N1 coiled within the intra-bobbin winding width K1 of the split bobbin B and the secondary windings N2 (and N2A) coiled within the intra-bobbin winding width K2 are arrayed without any gap, i.e., in a state where the mutually adjacent primary windings N1 are in contact with each other.

One end of the primary winding N1 of the insulating converter transformer PIT is connected to the collector of the switching element Q1, while the other end thereof is connected to the positive terminal (rectified smoothed voltage Ei) of the smoothing capacitor Ci via a series connection of the detection coil ND, as shown in the diagram.

On the secondary side of the insulating converter transformer PIT, an alternating voltage induced by the primary winding N1 is generated in the secondary winding N2. In this case, since a secondary parallel resonance capacitor C2 is connected in parallel to the secondary winding N2, a parallel resonance circuit is formed by leakage inductances L2 (and L2A) of the secondary windings N2 (and N2A) and a capacitance of the secondary parallel resonance capacitor C2. Due to this parallel resonance circuit, the alternating voltage generated in the secondary winding N2 (and N2A) is obtained as a resonance voltage. That is, the operation on the secondary side is performed in a voltage resonance mode.

More specifically, this power circuit has, on its primary side, a parallel resonance circuit to execute the switching operation in a voltage resonance mode, and also has, on its secondary side, another parallel resonance circuit to perform half-wave rectification (voltage resonance operation). In this specification, the switching converter of a configuration equipped with resonance circuits on its primary and secondary sides as mentioned above will be referred to as "composite resonance type switching converter".

In the secondary parallel resonance circuit formed as described, a center tap is provided for the secondary winding N2, and rectifying diodes D01, D02 and smoothing capacitors C01, C02 are connected as shown in the diagram, thereby providing a first half-wave rectifying circuit 2 which consists of a combination of "rectifying diode D01 and smoothing capacitor C01", and a second half-wave rectifying circuit 3 which consists of a combination of "rectifying diode D02 and smoothing capacitor C02".

The first half-wave rectifying circuit 2 receives an input resonance voltage supplied from the secondary parallel resonance circuit and generates a DC output voltage E01. Similarly, the second half-wave rectifying circuit 3 receives an input resonance voltage supplied from the secondary parallel resonance circuit and generates a DC output voltage E02.

In this case, the DC output voltage E01 and the DC output voltage E02 are branched and delivered to the control circuit 1 as well. In the control circuit 1, the DC output voltage E01 is used as a detection voltage, and the DC output voltage E02 is used as an operating power for the control circuit 1.

In the insulating converter transformer PIT, the mutual inductance M regarding the inductance L1 of the primary winding N1 and the inductances L2 and L2A of the secondary windings N2 and N2A becomes either +M or −M depending on the relation of the polarities (winding directions) of the primary winding N1 and the secondary windings N2 and N2A to the connection of the rectifying diodes D0 (D01, D02).

For example, if the connection is in a state of FIG. 9A, the mutual inductance becomes +M. Meanwhile, if the connection is in a state of FIG. 9B, the mutual inductance becomes −M.

Applying the above to the secondary operation of the power circuit shown in FIG. 7, when the alternating voltage obtained in the secondary winding N2 is positive for example in the first half-wave rectifying circuit 2, it is supposed that the operation with the rectified current flowing in the rectifying diode D01 is performed in the +M (forward) mode. Meanwhile, when the alternating voltage obtained in the secondary winding N2 is negative contrary to the above, the rectifying diode D0 is turned off so that none of the rectified current flows therein. That is, in this power circuit, the mutual inductance relative to the primary winding N1 and the secondary winding N2 executes rectification in the +M mode.

In this configuration, the power is supplied to the load increased by the action of the primary parallel resonance circuit and the secondary parallel resonance circuit, so that the power supplied to the load is also increased correspondingly thereto to consequently enhance the increase rate of the maximum load power.

Such correspondence to the load condition can be realized due to the improved situation where a saturated state is not reached readily because of the loose coupling attained by a required coupling coefficient with the gap G formed in the insulating converter transformer PIT, as explained previously with reference to FIG. 8. For example, in case the gap G is not existent in the insulating converter transformer PIT, the operation will be abnormal with a high probability as the insulating converter transformer PIT is placed in its saturated state during the flyback, whereby proper execution of the aforementioned half-wave rectification is rendered considerably difficult.

In the control circuit 1, the level of the control current (DC) caused to flow in the control coil NC is varied in accordance with a change of the secondary DC output voltage level E01, thereby varying under control the inductance LB of the driving coil NB wound in the orthogonal control transformer PRT. Consequently, such action changes the resonance condition of the series resonance circuit in the self-excited oscillation driving circuit formed for the switching element Q1 inclusive of the inductance LB of the driving coil NB. As will be described next with reference to FIG. 7, this operation varies the switching frequency of the switching element Q1 to eventually stabilize the secondary DC output voltage E01.

When the switching frequency is varied in FIG. 7 where there is provided the orthogonal control transformer PRT of a structure capable of varying under control the inductance LB of the driving coil NB, the on-time TON of the switching element Q1 is varied under control while the off-time TOFF thereof is maintained fixed. That is, in this power ;circuit, the constant voltage control is performed to vary the switching frequency under control to thereby control the resonance impedance with regard to the switching output, and simultaneously the conduction angle control (PWM control) of the switching element in the switching period is also performed. Such composite control operation is realized in a single set of control circuitry.

More specifically, in this power circuit, the secondary DC output voltage E01 delivered from the first half-wave rectifying circuit 2 is supplied as a detection voltage to the control circuit 1 to thereby vary under control the resonance voltage level obtained from the secondary winding N2 of the insulating converter transformer PIT, hence keeping constant the secondary DC output voltage E01. However, no action is executed to keep constant the secondary DC output voltage E02 which is delivered from the second half-wave rectifying circuit 3 and is supplied as an operating voltage to the control circuit 1.

FIGS. 12A to 12F graphically represent examples of operating waveforms in individual sections of the power circuit shown in FIG. 7, wherein the secondary output waveform is shown principally.

The output waveforms in FIGS. 12A to 12F are obtained when the power circuit of FIG. 7 is so formed as to achieve the optimal driving conditions with the maximum load power P0MAX=217 W. In an exemplary case where the alternating input voltage VAC is 100V, the insulating converting transformer PIT is so constructed that, for obtaining 135V of the regulated secondary DC output voltage E01 and 15V of the non-regulated secondary DC output voltage E02, 38 turns of coils are provided as the secondary winding N2, and 5 turns of coils are provided as the secondary winding N2A.

In such circuit configuration, the switching element Q1 performs its switching operation with the series resonance circuit (NB, CB) serving as a self-excited oscillation driving circuit, so that a primary parallel resonance voltage Vcp of FIG. 12A is obtained across the parallel connection circuit of the switching element Q1 and the parallel resonance capacitor Cr by the action of the parallel resonance circuit. As shown in the diagram, this parallel resonance voltage Vcp has a waveform being at a zero level during the on-time TON of the switching element Q1 and becoming a sine-wave pulse during the off-time TOFF thereof, correspondingly to the operation in a voltage resonance mode.

The switching output is transferred to the secondary side of the insulating converter transformer PIT by the on/off operation of the switching element Q1, so that a secondary resonance current I2 of a waveform shown in FIG. 12B flows in the connection end of the secondary winding N2 of the insulating converter transformer PIT and the rectifying diode D01, whereby a secondary resonance voltage V2 of a waveform shown in FIG. 12C is generated between such connection end and the secondary-side ground.

In this case, the rectifying diode D01 is turned on when the secondary resonance voltage V2 of FIG. 12C becomes higher than the level of the secondary DC output voltage E01, so that a secondary rectified current I3 of a waveform shown in FIG. 12D flows into the rectifying diode D01.

Meanwhile a secondary resonance voltage V3 of a waveform shown in FIG. 12E is generated across the secondary winding N2A. In this, case, the waveform of the secondary resonance voltage V3 is similar to that of the secondary resonance voltage V2 shown in FIG. 12C, and the similarity ratio therebetween is equivalent to the ratio between the total number of coils (38 turns) of the secondary winding N2 and the number of coils (5 turns) of the secondary winding N2A. That is, the voltage V3 becomes, for example, 5/38 times the secondary resonance voltage V2.

In this case also, the rectifying diode D02 shown in FIG. 7 is turned on when the secondary resonance voltage V3 becomes higher than the level of the secondary DC output voltage E02, so that a secondary rectified current I4 flows during a period (6 $\mu$sec) shown in FIG. 12F, and its peak value is 4.5 Ap for example.

The operating waveform of the secondary resonance voltage V2 shown in FIG. 12C and the operating waveform of the secondary resonance voltage V3 shown in FIG. 12E are similar to each other, but the secondary rectified current I3 of FIG. 12D flowing in the rectifying diode D01 and the secondary rectified current I4 of FIG. 12F flowing in the rectifying diode D02 are different in waveform from each other.

The above is supposed to result from that the secondary winding N2A coiled around the split bobbin B of the insulating converter transformer PIT is in a state of loose coupling to the primary winding N1 and the secondary winding N2. Since the number of turns of the secondary winding N2A is less than 5 as mentioned, in case the secondary winding N2A is coiled in alignment within the intra-bobbin winding width K2 of the split bobbin B, the secondary winding N2A is coiled in a partially unbalanced state such as on the right side alone of the intra-bobbin winding width K2, as shown in FIG. 11 for example.

If the secondary winding N2A is coiled, as described above, in a partially unbalanced state to the intra-bobbin winding width K2 of the split bobbin B where the secondary winding N2 is to be coiled, when the load power supplied by the non-regulated secondary DC output voltage E02 exceeds 10 W for example, the output current obtained from the secondary winding N2A is a combination of the +M operation mode (forward converter operation) and the −M operation mode (flyback converter operation) superposed thereon.

As a result, the secondary rectified current I3 is superposed on the secondary rectified current I4, and therefore the waveform of the secondary rectified current I4 becomes such that, as shown in FIG. 12F, its peak value is in the latter half of the conduction angle of the rectifying diode D02.

Thus, the heat generated in the rectifying diode D02 increases in accordance with a rise of the peak value of the secondary rectified current I4 flowing in the rectifying diode D02, hence increasing the power loss in the rectifying diode D02 and causing impairment of the reliability due to the temperature rise derived from the generated heat.

FIG. 13 graphically shows the relationship between the secondary DC output voltages E01, E02 and the load current IL2 supplied from the second half-wave rectifying circuit 3 in the power circuit of FIG. 7.

In FIG. 13, a straight line denoted by a white circle "○" represents the relationship between the secondary DC output voltage E02 and the load current IL2 in case the power circuit of FIG. 7 is so formed as to attain optimal driving conditions with the maximum load power P0MAX=217 W.

And a waveform denoted by a white triangle "Δ" represents the relationship between the secondary DC output voltage E02 and the load current IL2 in case the power circuit of FIG. 7 is so formed as to attain optimal driving conditions with the maximum load power P0MAX=82 W.

As obvious from FIG. 13, when the load current IL2 is changed from 0 A to 1.0 A in the power circuit formed correspondingly to P0MAX=217 W, the voltage variation level ΔE02 of the secondary DC output voltage E02 becomes approximately 6.6V.

Similarly, when the load current IL2 is changed from 0 A to 1.0 A in the power circuit formed correspondingly to P0MAX=82 W, the voltage variation level ΔE02 of the secondary DC output voltage E02 becomes approximately 6.4V. That is, in any of the above circuit configurations, the secondary DC output voltage level E02 is varied widely in response to the variation of the load current IL2 outputted from the second half-wave rectifying circuit 3, hence deteriorating the cross regulation.

Therefore, in a configuration where a 12V local regulator for example is connected to the output of the second half-wave rectifying circuit 3 and a regulated constant voltage is to be obtained from such a local regulator, it is necessary to maintain the secondary DC output voltage E02 above a predetermined level even when the secondary DC output voltage E02 has lowered in response to an increase of the load current IL2. In this case, however, the secondary DC output voltage E02 rises with a level reduction of the load current IL2, thereby increasing the power loss in the local regulator in response to a rise of the voltage level.

Also in the case of any change in the maximum load power P0 of the load which is supplied with the secondary DC output voltage E01 delivered from the first half-wave rectifying circuit 2, there occurs a variation in the level of the secondary DC output voltage E02 delivered from the second half-wave rectifying circuit 3.

As shown in FIG. 13 for example, the relationship between the level of the secondary DC output voltage E02 and the load current IL2 is different depending on whether the maximum load power P0=217 W or P0=82 W of the load supplied with the secondary DC output voltage E01. This signifies that the level of the secondary DC output voltage E02 is varied even in response to any variation of the load connected to the regulated secondary DC output voltage E01, and it has been customary heretofore that cross regulation is deteriorated by such level variation of the secondary DC output voltage E02.

SUMMARY OF THE INVENTION

An object of the present invention is to provide a switching power circuit and an insulating converter transformer which are capable of reducing the power loss on a secondary side.

To achieve the above object, according to a first aspect of the present invention, there is provided a switching power circuit having the following configuration. That is, the switching power circuit includes a rectifying and smoothing means for generating a rectified smoothed voltage out of an input commercial AC power and outputting the same as a DC input voltage, and an insulating converter transformer where a primary winding is coiled on its primary side while at least a first secondary winding and a second secondary winding, whose number of turns is less than a predetermined number of turns, are coiled on its secondary side. The transformer has a gap in cores thereof to obtain a required coupling coefficient for loose coupling with regard to the primary winding and the first secondary winding, and serves to transfer the output of the primary side to the secondary side.

The switching power circuit also includes a switching means having a switching element to deliver the DC input voltage through on/off control thereof to the primary winding of the insulating converter transformer, and a primary resonance circuit for actuating the switching means in a resonance mode. The resonance circuit consists at least of a leakage inductance component including the primary winding of the insulating converter transformer, and a capacitance of a primary resonance capacitor.

The switching power circuit further includes a secondary resonance circuit consisting of a leakage inductance component of one secondary winding of the insulating converter transformer and the capacitance of the secondary resonance capacitor to thereby form a resonance circuit, wherein the secondary resonance capacitor is connected to at least one of the secondary windings of the insulating converter transformer, a first DC output voltage generating means so formed as to obtain a first secondary DC output voltage from the alternating voltage induced in the first secondary winding, a second DC output voltage generating means so formed as to obtain a second secondary DC output voltage from the alternating voltage induced in the second secondary winding, and a constant voltage control means for executing constant voltage control of the first secondary DC output voltage by varying the switching frequency of the switching element in accordance with the level of the first secondary DC output voltage.

In this configuration, the second secondary winding of the insulating converter transformer is so coiled as to achieve a state of tight coupling with respect to the primary winding and the first secondary winding.

According to a second aspect of the present invention, there is provided an insulating converter transformer including a primary winding coiled on its primary side, a first secondary winding coiled on its secondary side, a second secondary winding whose number of turns is less than a predetermined number, and an EE-shaped core with a gap formed in a center magnetic leg thereof so that a required coupling coefficient for loose coupling is obtained with regard to the primary winding and the first secondary winding. In this structure, the second secondary winding is so coiled as to achieve a state of tight coupling with respect to the primary winding and the first secondary winding.

According to the above configuration, the second secondary winding provided on the secondary side of the insulating converter transformer is coiled in such a manner that a state of tight coupling is achieved between the primary winding on the primary side of the insulating converter transformer and the first secondary winding on the secondary side thereof, hence suppressing the secondary current which is generated in the second secondary winding by the flyback converter operation of the insulating converter transformer.

Further, the switching power circuit is formed by the use of the insulating converter transformer where the second secondary winding on the secondary side is so coiled as to achieve a state of tight coupling with respect to the primary winding on the primary side and the first secondary winding on the secondary side, thereby suppressing the peak value of the secondary current induced in the second secondary winding.

Thus, it is possible to reduce the power loss in the rectifying diode that constitutes a second DC output voltage generating means, and further to prevent generation of heat in the rectifying diode to eventually enhance the reliability thereof.

The second secondary winding provided on the secondary side of the insulating converter transformer is formed independently of the first secondary winding, and the second secondary winding is coiled at a fixed equal winding pitch in an upper or lower portion of the first secondary winding coiled around the split bobbin, so that a regulated stable secondary DC output voltage can be supplied even in case a heavy load of more than 10 W or so is connected to the second DC output voltage generating means.

Further, the second secondary winding on the secondary side of the insulating converter transformer is formed with the first secondary winding and the center tap, and is coiled at a fixed equal winding pitch in an upper portion of the first secondary winding coiled around the split bobbin, hence realizing delivery of a regulated stable secondary DC output when a light load of less than 10 W or so is connected the second DC output voltage generating means.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIGS. 4A to 4F are waveform charts showing the operations of principal sections in the power circuit of the embodiment;

FIG. 5 graphically shows the relationship between a load current and a secondary DC output voltage obtained from the secondary side of the insulating converter transformer;

FIG. 10 typically illustrates the winding directions in the insulating converter transformer employed in the power circuit of FIG. 7;

FIG. 11 is a diagram showing how the secondary winding N2A is coiled in the split bobbin B;

DESCRIPTION OF THE PREFERRED EMBODIMENTS

Figure 1:
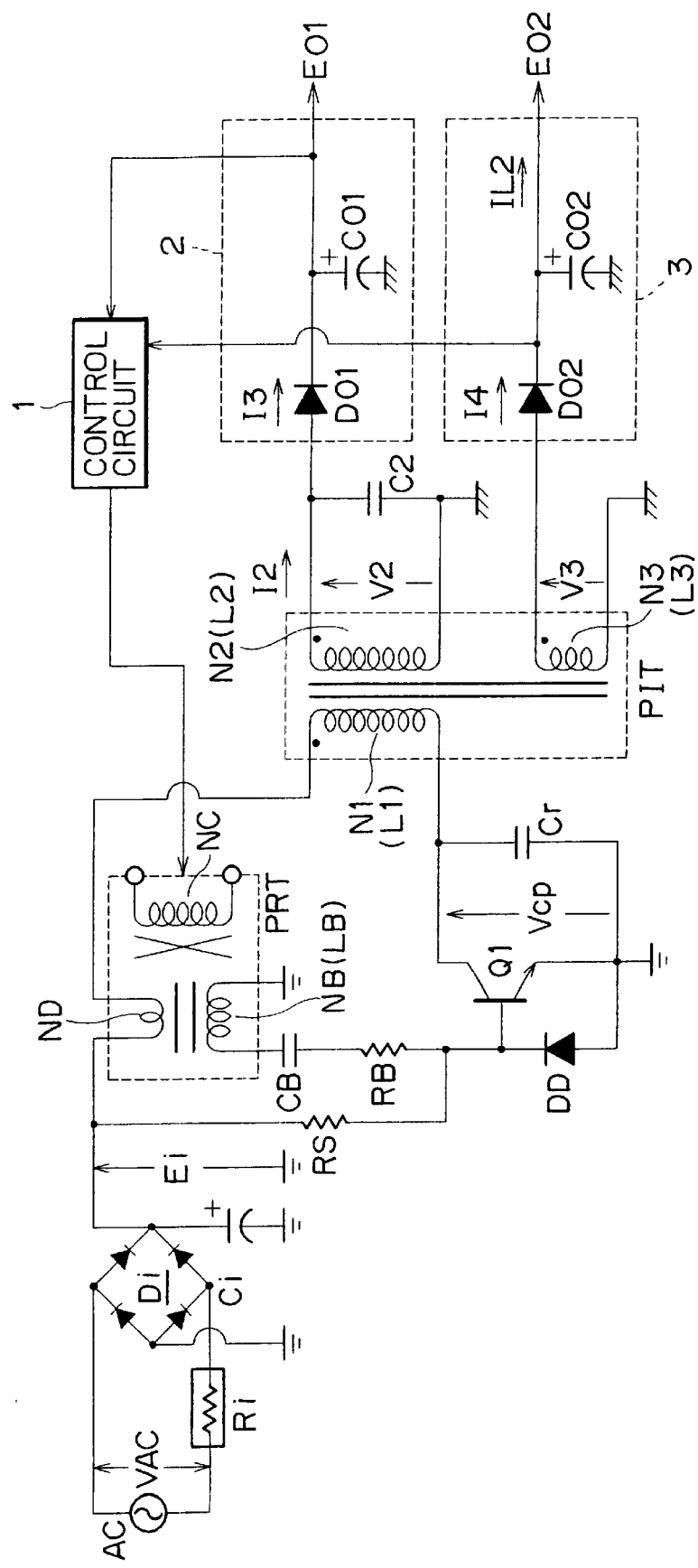
FIG. 1 is a circuit diagram showing an exemplary configuration of a power circuit as an embodiment of the present invention.

A circuit diagram of FIG. 1 shows a configuration of the power circuit as a preferred embodiment of the present invention. In this diagram, any component parts corresponding to those in FIG. 7 are denoted by the same reference numerals or symbols, and a repeated explanation thereof is omitted.

The power circuit of the embodiment shown in FIG. 1 comprises, as will be described in detail later, an insulating converter transformer PIT equipped with a secondary winding N2 having a first secondary winding on the secondary side of the insulating converter transformer PIT and also with a tertiary winding N3 which is coiled independently of the secondary winding N2 and serves as a second secondary winding.

Figure 7:
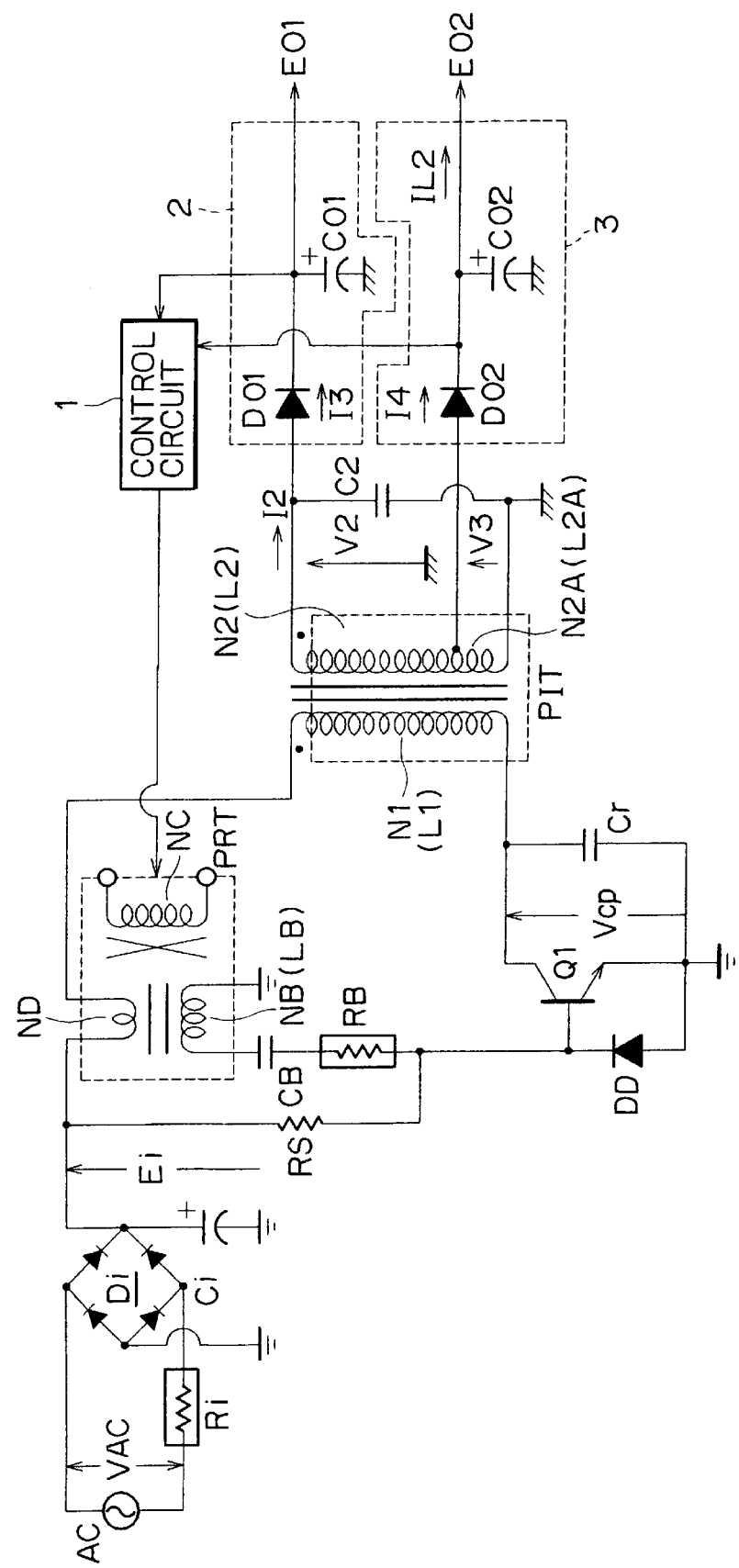
FIG. 7 is a circuit diagram showing the configuration of a power circuit according to prior art.
Figure 8:
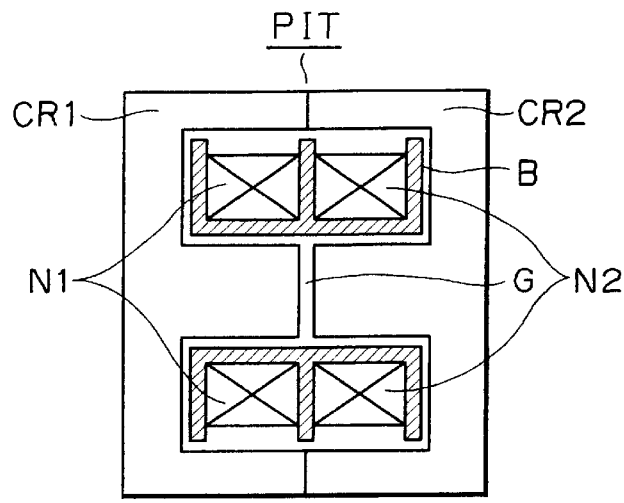
FIG. 8 is a sectional view showing the structure of the insulating converter transformer.

In the power circuit of the embodiment using such insulating converter transformer PIT, coupling of the tertiary winding N3, the primary winding N1 and the secondary winding N2 can be held in a state of tighter coupling as compared with the coupling of the secondary winding NA2, the primary winding N1 and the secondary winding N2 of the insulating converter transformer PIT employed in the power circuit of FIG. 7.

Consequently, in this embodiment, the secondary current derived from the current induced in the tertiary winding N3 of the insulating converter transformer PIT is obtained in the +M operation mode (forward converter operation) without being harmfully affected by the −M operation mode (flyback converter operation) of the insulating converter transformer PIT even when the load power of the second half-wave rectifying circuit 3 is more than 10 W for example. Thus, as will be described later, it becomes possible to lower the peak value of the secondary rectified current I4 flowing in the rectifying diode D02 which constitutes the second half-wave rectifying circuit 3.

Figure 2:
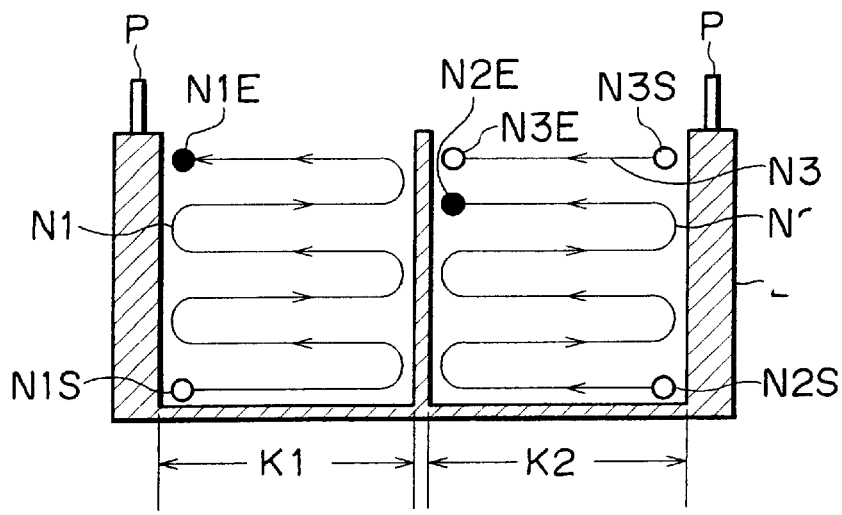
FIG. 2 typically illustrates the winding directions in an insulating converter transformer.
Figure 3:
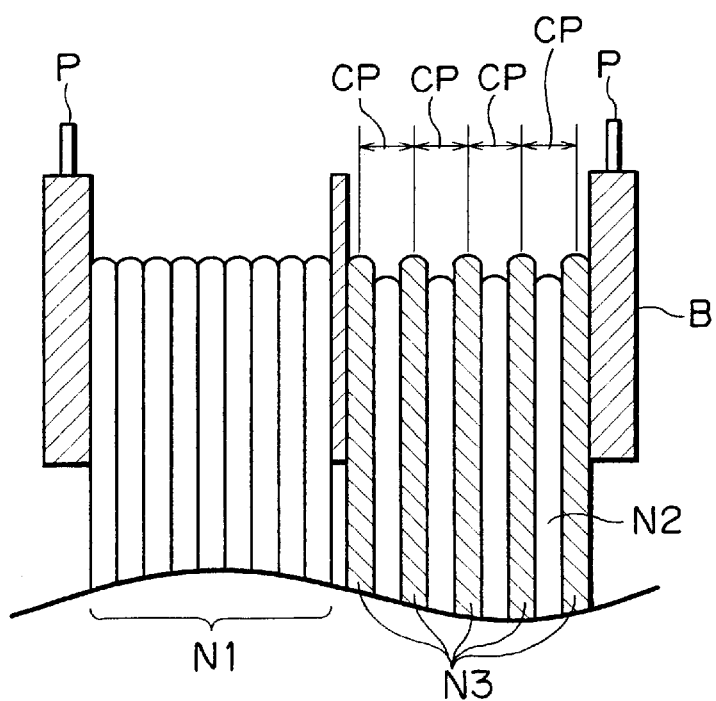
FIG. 3 is a diagram showing how a tertiary winding N3 is coiled in a split bobbin B.

Referring now to FIGS. 2 and 3, an explanation will be given on the secondary winding N2 and the tertiary winding N3 coiled around the split bobbin B of the insulating converter transformer PIT in this embodiment.

FIG. 2 typically illustrates how the windings are coiled around the split bobbin B of the insulating converter transformer PIT provided in the power circuit of FIG. 1. In this diagram, any component parts or regions corresponding to those in FIG. 10 are denoted by the same reference numerals or symbols, and a repeated explanation thereof is omitted.

In this case, the secondary winding N2 is coiled from its start position N2S in the same manner as that in FIG. 10. Since the secondary winding N2 is formed independently of the tertiary winding N3, it is coiled by a predetermined number of turns from its start position N2S up to its end position N2E.

And subsequently the tertiary winding N3, which is to be formed independently of the secondary winding N2, is coiled on the secondary winding N2 coiled around the split bobbin B.

In this case, the tertiary winding N3 is coiled from a start position N3S to an end position N3E in the entire intra-bobbin winding width K2 of the split bobbin B, as shown in FIG. 3.

That is, in this embodiment, the tertiary winding N3 formed on the secondary winding N2 is not coiled in a state of alignment where adjacent turns thereof are in mutual contact as shown in FIG. 10, but a fixed equal winding pitch CP is kept between adjacent turns of the tertiary winding N3 as shown in FIG. 3.

Thus, in this embodiment, the tertiary winding N3 to be formed independently of the secondary winding N2 is coiled on the secondary winding N2, wherein the tertiary winding N3 is coiled in the entire intra-bobbin winding width K2 of the split bobbin B while a fixed equal winding pitch is kept between adjacent turns thereof.

Due to such a winding technique, as compared with the insulating converter transformer PIT explained with reference to FIGS. 10 and 11 for example where the secondary winding N2A is in loose coupling with respect to the primary winding N1 and the secondary winding N2, the tertiary winding N3 in this embodiment can be held in a state of tight coupling with respect to the primary winding N1 and the secondary winding N2.

FIGS. 4A to 4F graphically represent examples of operating waveforms in individual sections of the power circuit equipped with the insulating converter transformer PIT shown in FIG. 2, wherein the secondary output waveforms are shown principally.

The output waveforms shown in FIGS. 4A to 4F are obtained when the power circuit of FIG. 1 is so formed as to achieve the optimal driving conditions with the maximum load power P0MAX=217 W. In an exemplary case where the alternating input voltage VAC is 100V similarly to the aforementioned case of FIGS. 12A to 12F, the insulating converting transformer PIT is so constructed that, for obtaining 135V of the regulated secondary DC output voltage E01 and 15V of the non-regulated secondary DC output voltage E02, 33 turns of coils are provided as the secondary winding N2, and 5 turns of coils are provided as the tertiary winding N3.

In this case, as the switching element Q1 performs its switching operation, a primary parallel resonance voltage Vcp of FIG. 4A is obtained from the collector of the switching element Q1 by the action of the parallel resonance circuit.

Then the switching output is transferred to the secondary side of the insulating converter transformer PIT by the on/off operation of the switching element Q1. And similarly to the waveforms shown previously in FIGS. 12A to 12F, a secondary resonance current I2 of a waveform shown in FIG. 4B is obtained at the junction of the secondary winding N2 of the insulating converter transformer PIT and the anode of the rectifying diode D01, so that a secondary resonance voltage V2 of FIG. 4C is generated across the secondary winding N2.

In this case, the rectifying diode D01 is turned on when the secondary resonance voltage V2 of FIG. 4C exceeds the level of the secondary DC output voltage E01, so that a secondary rectified current I3 of FIG. 4D comes to flow into the rectifying diode D01.

Figure 12:
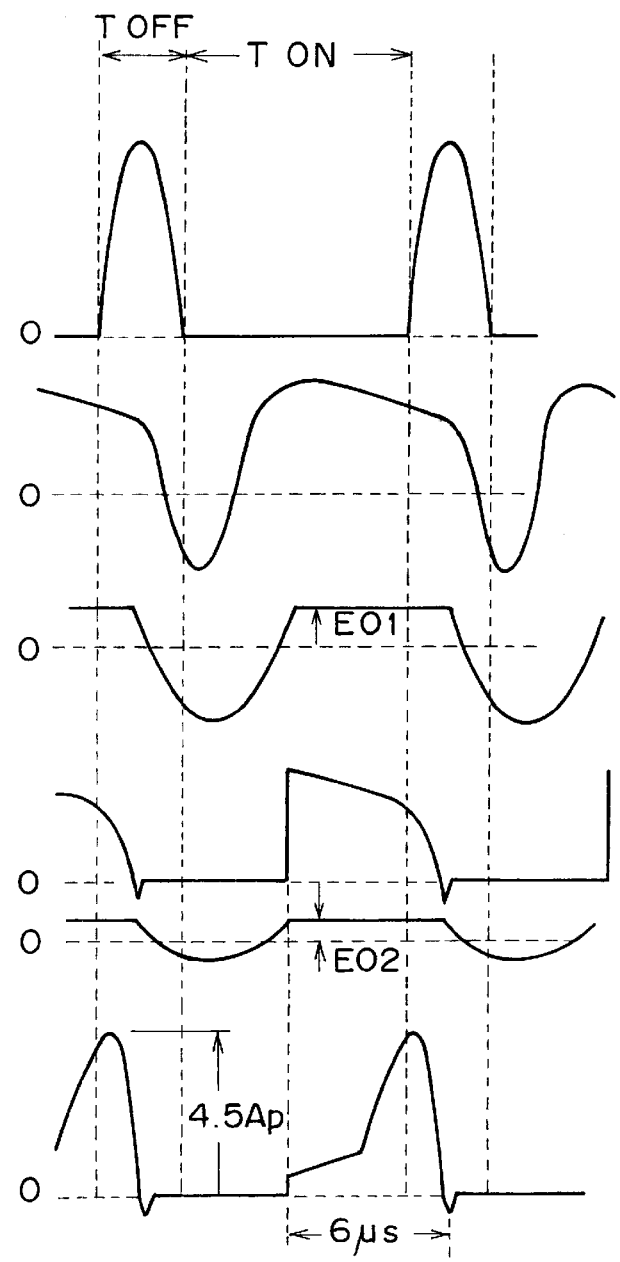
FIGS. 12A to 12F are waveform charts showing the operations of principal sections in the power circuit according to the prior art.

The secondary resonance voltage V3 generated across the tertiary winding N3 has a waveform of FIG. 4E and is substantially equal to the secondary resonance voltage V3 of FIG. 12E generated across the secondary winding N2A. The voltage V3 is similar in waveform to the secondary resonance voltage V2.

Meanwhile a secondary rectified current I4, which flows in the rectifying diode D02 of the second half-wave rectifying circuit 3 connected to the tertiary winding N3 of the insulating converter transformer PIT, has a waveform of FIG. 4F wherein its output duration is shortened, e.g. from 6 μs to 5 μs as compared with the secondary rectified current I4 of FIG. 12F, and further its peak level is reduced. e.g., from 4.5 Ap to 2.5 Ap.

In this embodiment, as explained already with reference to FIG. 3, the insulating converter transformer PIT is so constructed that the tertiary winding N3 to be formed around the split bobbin B independently of the secondary winding N2 is coiled at a fixed equal winding pitch so as not to be in a partially unbalanced state on the secondary winding N2, whereby the tertiary winding N3 is held in tight coupling with respect to the primary winding N1 and the secondary winding N2. Consequently, the secondary rectified current I4 of FIG. 4F can be obtained in the +M operation mode (forward converter operation) of the insulating converter transformer PIT with suppression of any harmful effect in the −M operation mode.

As a result, the current generated in the tertiary winding N3 by the flyback operation is decreased, and thus it becomes possible to lower, e.g., from 4.5 Ap to 2.5 Ap, the peak current level of the secondary rectified current I4, which is derived from the current by the flyback operation, in the latter half of the conduction angle of the rectifying diode D02.

Therefore, in the above configuration of the power circuit employing such insulating converter transformer PIT, the peak value of the secondary rectified current I4 flowing in the rectifying diode D02 can be suppressed to consequently reduce the power loss in the rectifying diode D02 and also to decrease the temperature rise caused by the generated heat in the rectifying diode D02, hence enhancing the reliability of the rectifying diode D02.

In this embodiment where the tertiary winding N3 is formed on the secondary side of the insulating converter transformer PIT independently of the secondary winding N2, it becomes possible to eliminate the step of drawing out the secondary winding N2 as a center tap CT and soldering the same to a pin terminal P to form the secondary winding portion N2A as in the insulating converter transformer PIT shown in FIG. 10, thereby attaining another advantage that facilitates the process of production.

In the power circuit of this embodiment, it is further possible to minimize, for example, the variation of the non-regulated secondary DC output voltage E02 obtained from the second half-wave rectifying circuit 3. In case the power circuit is so formed as shown in FIG. 5 correspondingly to the maximum load power P0MAX=217 W for example, the voltage variation level ΔE02 of the secondary DC output voltage E02 is approximately 1.3V when the load current IL2 outputted from the second half-wave rectifying circuit 3 has changed from 0 A to 1.0 A.

Similarly, in case the power circuit is formed correspondingly to the maximum load power P0MAX=82 W for example, the voltage variation level ΔE02 of the secondary DC output voltage E02 is approximately 2.2V when the load current IL2 outputted from the second half-wave rectifying circuit 3 has changed from 0 A to 1.0 A.

Figure 13:
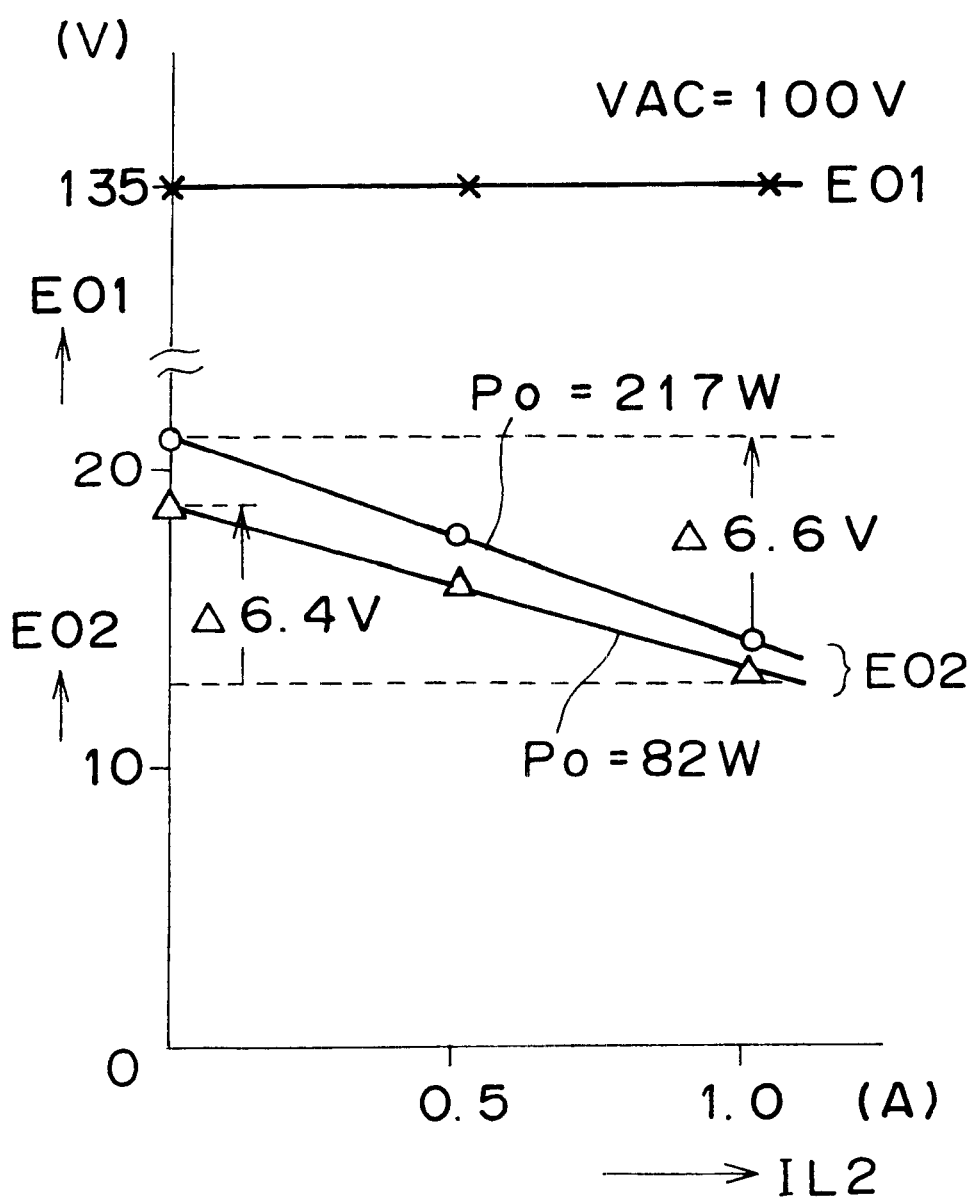
FIG. 13 graphically shows the relationship between a load current and a secondary DC output voltage obtained from the secondary side of the insulating converter transformer employed in the power circuit according to the prior art.

As obvious from comparison with FIG. 13, in case the power circuit is formed correspondingly to the load power= 217 W, the voltage variation level ΔE of the secondary DC output voltage E02 obtained from the second half-wave rectifying circuit 3 is approximately 5.3V. And in case the power circuit is formed correspondingly to the load power= 82 W, the voltage variation level ΔE of the secondary DC output voltage E02 obtained from the second half-wave rectifying circuit 3 is approximately 4.2V. Thus, in any of such circuit configurations, the variation of the secondary DC output voltage E02 derived from the variation of the load current IL2 outputted from the second half-wave rectifying circuit 3 can be suppressed to eventually prevent deterioration of the cross regulation.

As a result, if a 12V local regulator for example is connected to the output of the second half-wave rectifying circuit 3, it is possible to suppress any voltage level variation of the secondary DC output voltage E02 derived from the variation of the load current IL2, hence reducing the power loss caused by the generated heat in the local regulator. And it becomes also possible to down-size a radiator provided for the local regulator.

As shown in FIG. 5, there is diminished the voltage level difference generated due to the difference between the maximum load powers (217 W and 82 W) of the load connected to the first half-wave rectifying circuit 2 in the power circuit of this embodiment, so that the level variation of the secondary DC output voltage E02 can be reduced by the variation of the load connected to the regulated secondary DC output voltage E01.

FIG. 6 typically illustrates how the windings are coiled in an insulating converter transformer PIT of another embodiment. In this diagram, any component parts or regions corresponding to those in FIGS. 2 and 10 are denoted by the same reference numerals or symbols, and a repeated explanation thereof is omitted.

Figure 6A:
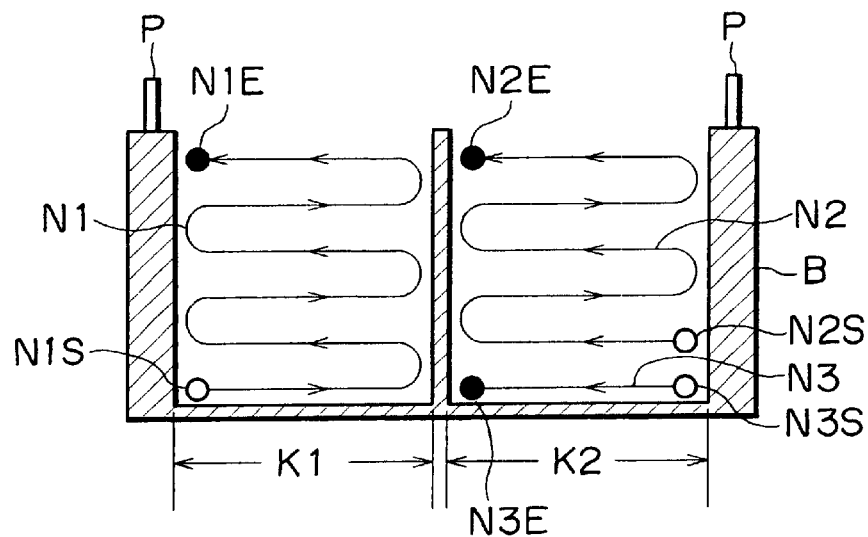
FIGS. 6A and 6B typically illustrate the winding directions in an insulating converter transformer of another embodiment.

In the insulating converter transformer PIT of FIG. 6A, the positions of the secondary winding N2 and the tertiary winding N3 in the aforementioned insulating converter transformer PIT of FIG. 2 are replaced with each other. In this structure, as shown in the diagram, the tertiary winding N3 is coiled at the center (lower portion) of the split bobbin B, and the secondary winding N2 is coiled on the tertiary winding N3. In this case also, the tertiary winding N3 is so coiled that adjacent turns thereof are spaced apart mutually at a fixed equal winding pitch CP.

In the above configuration of the power circuit employing such insulating converter transformer PIT, the voltage level of the secondary DC output voltage E02 for example can be raised and, even when the variation of the load current IL2 supplied from the secondary DC output is increased, it is still possible to suppress the level variation of the secondary DC output voltage E02.

In some apparatus, there may exist the necessity of connecting, e.g., a 24V audio output regulator to the secondary DC output voltage E02. And in such an audio output regulator, the load current IL2 is varied in a relatively wide range of 0 A to 2 A. Therefore, the insulating converter transformer PIT of the above-described structure is adapted particularly for connection of a circuit such as an audio output regulator where the load current variation is great.

Figure 6B:
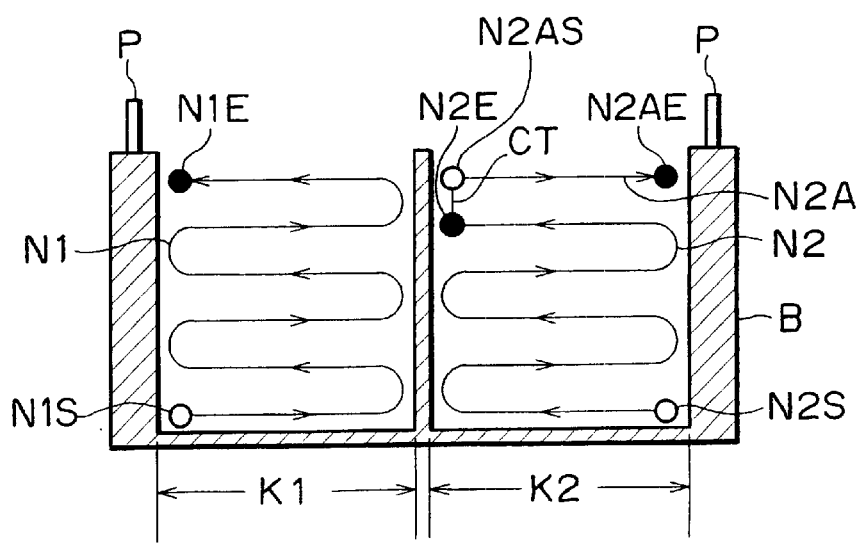
Figure 9A:
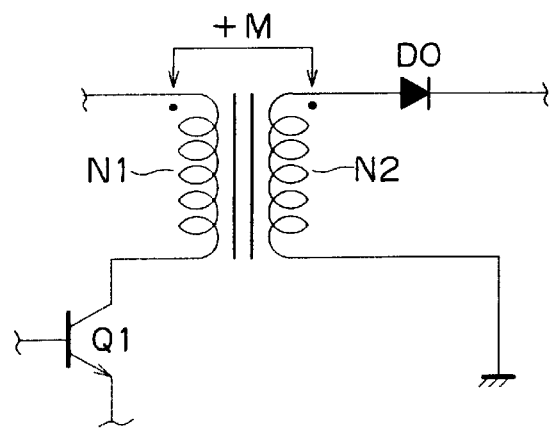
FIGS. 9A and 9B are explanatory diagrams showing the operations performed when the mutual inductance is +M and −M respectively.
Figure 9B:
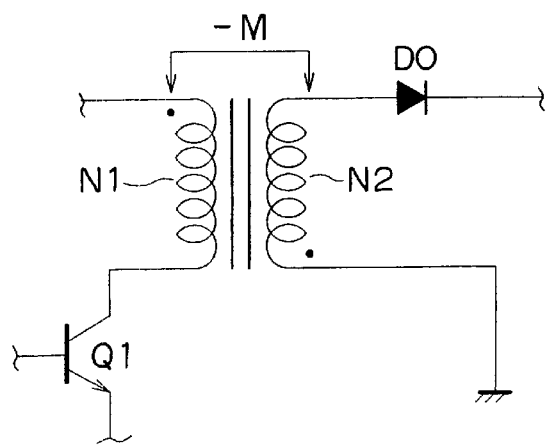

In the secondary-side structure of the insulating converter transformer PIT shown in FIG. 6B, a center tap CT is provided for the secondary winding N2 of the insulating converter transformer PIT as in the aforementioned insulating converter transformer PIT of FIG. 9. In this case, however, the secondary winding portion N2A is coiled on the secondary winding N2 around the split bobbin B in such a manner that adjacent turns thereof are spaced apart mutually at a fixed equal winding pitch. That is, the secondary winding portion N2A is coiled evenly in the entire intra-bobbin winding width K2 of the split bobbin B without being partially unbalanced.

The power circuit employing the insulating converter transformer PIT of such a structure is adapted for use particularly in a case where, for example, a light load of 10 W or less is connected to the second half-wave rectifying circuit 3. In this case, the operating waveform of the secondary rectified current I4 flowing in the rectifying diode D02 of the second half-wave rectifying circuit 3 is the same as the waveform shown in FIG. 4C, hence reducing the variation value ΔE02 of the secondary DC output voltage E02.

The embodiment mentioned above represents an exemplary case where the power circuit is equipped with, as a composite resonance type switching converter, a single-end voltage resonance type converter which consists of a switching element of one transistor on its primary side. However, it is to be understood that the present invention is applicable also to a push-pull converter which alternately actuates switching elements of two transistors.

In each of the embodiments described above, a self-excited voltage resonance type converter is provided on the primary side, but the present invention is applicable also to a separately excited structure which comprises, for example, an IC (integrated circuit) oscillation driver instead of a self-excited oscillation driver and drives the switching element of the voltage resonance type converter by such IC oscillation driver. When such a separately excited structure is adopted, an orthogonal control transformer PRT is eliminated.

When a separately excited structure is adopted as mentioned, it is possible to replace the switching element Q, which consists of one bipolar transistor (BJT), with a Darlington circuit where two bipolar transistors (BJT) are in Darlington connection. It is further possible to replace the switching element Q of one bipolar transistor (BJT) with a MOS-FET (MOS field effect transistor; metal oxide semiconductor), an IGBT (insulated-gate bipolar transistor), or a SIT (electrostatic induction thyristor). By using any of such Darlington circuit or the above device as a switching element, an enhanced efficiency is rendered attainable.

In using any of such devices as a switching element, although not shown, the configuration of the driving circuit may be modified in conformity with the characteristics of the device to be employed practically in place of the switching element Q. For example, in the case of using a MOS-FET as the switching element, a separately excited voltage driving structure may be adopted.

While a preferred embodiment of the present invention has been described using specific terms, such description is for illustrative purposes only, and it is to be understood that changes and variations may be made without departing from the spirit or scope of the following claims.

What is claimed is:

1. A switching power circuit comprising:

a rectifying and smoothing means for generating a rectified smoothed voltage out of an input commercial AC power and outputting the same as a DC input voltage;

an insulating converter transformer where a primary winding is coiled on its primary side while at least a first secondary winding and a second secondary winding, whose number of turns is less than a predetermined number of turns, are coiled on its secondary side, said transformer having a gap in cores thereof to obtain a required coupling coefficient for loose coupling with regard to said primary winding and said first secondary winding, and serving to transfer the output of the primary side to the secondary side;

a switching means having a switching element to deliver the DC input voltage through on/off control thereof to the primary winding of said insulating converter transformer;

a primary resonance circuit for actuating said switching means in a resonance mode, said primary resonance circuit consisting at least of a leakage inductance component including the primary winding of said insulating converter transformer, and a capacitance of a primary resonance capacitor;

a secondary resonance circuit consisting of a leakage inductance component of one secondary winding of said insulating converter transformer and the capacitance of said secondary resonance capacitor to thereby form a resonance circuit, wherein said secondary resonance capacitor is connected to at least one of the secondary windings of said insulating converter transformer;

a first DC output voltage generating means so formed as to obtain a first secondary DC output voltage from the alternating voltage induced in the first secondary winding;

a second DC output voltage generating means so formed as to obtain a second secondary DC output voltage from the alternating voltage induced in the second secondary winding; and a constant voltage control means for executing constant voltage control of the first secondary DC output voltage by varying the switching frequency of said switching element in accordance with the level of the first secondary DC output voltage;

wherein the second secondary winding of said insulating converter transformer is so coiled as to achieve a state of tight coupling with respect to said primary winding and said first secondary winding.

2. A switching power circuit according to claim 1, wherein the second secondary winding of said insulating converter transformer is coiled independently of the first secondary winding and around a split bobbin where coiled areas of the windings are split on the primary side and the secondary side,: in such a manner that a fixed equal winding pitch is kept between adjacent turns in the upper or lower coiled portion of the first secondary winding.

3. A switching power circuit according to claim 1, wherein the second secondary winding of said insulating converter transformer is connected at one end thereof to the first secondary winding via a tap and is coiled around a split bobbin where coiled areas of the windings are split on the primary side and the secondary side, in such a manner that a fixed equal winding pitch is kept between adjacent turns in the upper coiled portion of the first secondary winding.

* * * * *